United States Patent
Yeom et al.

(10) Patent No.: US 9,927,867 B2
(45) Date of Patent: Mar. 27, 2018

(54) METHOD AND APPARATUS FOR PROCESSING AN IMAGE BASED ON DETECTED INFORMATION

(71) Applicant: SAMSUNG ELECTRONICS CO., LTD., Suwon-si (KR)

(72) Inventors: Jee-young Yeom, Incheon (KR); Min-Woo Lee, Hwaseong-si (KR); Jong-Ho Kim, Seoul (KR); Hyun-Hee Park, Seoul (KR); Hak-gyun Bae, Andong-si (KR); Seul-ki Jang, Suwon-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

(21) Appl. No.: 14/220,876

(22) Filed: Mar. 20, 2014

(65) Prior Publication Data
US 2014/0285431 A1    Sep. 25, 2014

Related U.S. Application Data

(60) Provisional application No. 61/803,595, filed on Mar. 20, 2013.

(30) Foreign Application Priority Data

Aug. 27, 2013 (KR) .......................... 10-2013-0102015

(51) Int. Cl.
*G09G 5/00* (2006.01)
*G06F 3/01* (2006.01)
(Continued)

(52) U.S. Cl.
CPC ................ *G06F 3/011* (2013.01); *G06T 5/00* (2013.01); *G06T 5/001* (2013.01); *G09G 5/00* (2013.01);
(Continued)

(58) Field of Classification Search
None
See application file for complete search history.

(56) References Cited

U.S. PATENT DOCUMENTS 6,292,228 B1 *  9/2001  Cho .......................... G09G 5/00
                                                       348/603
7,609,282 B2   10/2009  Aoki et al.
(Continued)

FOREIGN PATENT DOCUMENTS

CN    1241098 A    1/2000
CN    101115160 A  1/2008
(Continued)

OTHER PUBLICATIONS

International Search Report and Written Opinion dated Jun. 9, 2014 issued by the International Searching Authority in counterpart International Application No. PCT/KR2014/002335 (PCT/ISA/210/220/237).
(Continued)

*Primary Examiner* — Ifedayo Iluyomade
(74) *Attorney, Agent, or Firm* — Sughrue Mion, PLLC (57) ABSTRACT

A method and apparatus for processing an image based on detected information are provided. The method includes obtaining information relating to properties of the image, property information related to the image; obtaining ambient environment information of a display device for displaying the image; and processing the image based on the property information and the ambient environment information.

38 Claims, 5 Drawing Sheets

(51) Int. Cl.
*H04N 5/20* (2006.01)
*H04N 5/58* (2006.01)
*H04N 9/73* (2006.01)
*G06T 5/00* (2006.01)
*H04N 21/422* (2011.01)
*H04N 21/431* (2011.01)
*H04N 21/44* (2011.01)

(52) U.S. Cl.
CPC ............ *H04N 5/20* (2013.01); *H04N 5/58* (2013.01); *H04N 9/73* (2013.01); *H04N 21/42202* (2013.01); *H04N 21/4318* (2013.01); *H04N 21/44008* (2013.01); *G09G 2320/0626* (2013.01); *G09G 2354/00* (2013.01); *G09G 2360/144* (2013.01)

(56) References Cited

U.S. PATENT DOCUMENTS

| | | | |
|---|---|---|---|
| 8,310,496 | B2 | 11/2012 | Imai et al. |
| 2003/0202121 | A1 | 10/2003 | Huh et al. |
| 2007/0139405 | A1* | 6/2007 | Marcinkiewicz .... G09G 3/2003 345/207 |
| 2008/0080764 | A1 | 4/2008 | Kim et al. |
| 2008/0143734 | A1 | 6/2008 | Ishii et al. |
| 2008/0316372 | A1 | 12/2008 | Xu et al. |
| 2009/0009525 | A1 | 1/2009 | Hirashima et al. |
| 2009/0073107 | A1* | 3/2009 | Chen ................. G09G 3/3406 345/102 |
| 2009/0268960 | A1 | 10/2009 | Imai et al. |
| 2010/0118198 | A1 | 5/2010 | Usui |
| 2011/0081132 | A1* | 4/2011 | Iwata .................. H04N 5/144 386/353 |
| 2013/0082991 | A1* | 4/2013 | Lin ...................... G09G 5/00 345/207 |
| 2013/0082993 | A1* | 4/2013 | Kim .................... G09G 5/10 345/207 |

FOREIGN PATENT DOCUMENTS

| | | |
|---|---|---|
| EP | 2482272 A1 | 8/2012 |
| JP | 2002158941 A | 5/2002 |
| JP | 2003-324756 A | 11/2003 |
| JP | 2003-331275 A | 11/2003 |
| JP | 2004-187147 A | 7/2004 |
| JP | 2006-270417 A | 10/2006 |
| JP | 2007-057599 A | 3/2007 |
| JP | 2008-085996 A | 4/2008 |
| JP | 2009-229952 A | 10/2009 |
| JP | 2009-267929 A | 11/2009 |
| KR | 1020070084293 A | 8/2007 |
| KR | 10-0993284 B1 | 11/2010 |

OTHER PUBLICATIONS

Communication dated Sep. 11, 2014, issued by the Korean Intellectual Property Office in counterpart Korean Application No. 10-2013-0102015.

Communication dated Mar. 31, 2015, issued by the Japanese Patent Office in counterpart Japanese Application No. 2014-058742.

Communication issued Jan. 5, 2016, issued by the Japanese Patent Office in counterpart Japanese Patent Application No. 2014-058742.

Communication dated Oct. 19, 2015, from the European Patent Office in counterpart European Application No. 14160971.9.

Communication dated Jul. 5, 2016, from the State Intellectual Property Office of People's Republic of China in counterpart Application No. 201410121353.7.

Communication issued Mar. 7, 2017 by the State Intellectual Property Office of P.R. China in counterpart Chinese Patent Application No. 201410121353.7.

\* cited by examiner

METHOD AND APPARATUS FOR PROCESSING AN IMAGE BASED ON DETECTED INFORMATION

RELATED APPLICATIONS

This application claims priority from U.S. Provisional Patent Application No. 61/803,595, filed on Mar. 20, 2013, in the U.S. Patent and Trademark Office, and the benefit of Korean Patent Application No. 10-2013-0102015, filed on Aug. 27, 2013, in the Korean Intellectual Property Office, the disclosures of which are incorporated herein by reference, in their entireties.

BACKGROUND

1. Technical Field

One or more exemplary embodiments relate to a method and apparatus for displaying an image which is processed based on detected information.

2. Description of the Related Art

A display device may display a processed image to improve sharpness or details of an image.

An image processing apparatus may process an image to improve image quality, and thus a displayed image may be recognized as having better quality.

SUMMARY

One or more exemplary embodiments include a method and apparatus for processing an image based on property information of an image to be displayed, or ambient environment information of a display device.

Additional aspects will be set forth in part in the description which follows, and in part, will be apparent from the description, or may be learned by practice of the exemplary embodiments.

According to one or more exemplary embodiments, a method of processing an image, the method including obtaining property information of the image; obtaining ambient environment information of a display device to display the image; and processing the image based on the property information and the ambient environment information.

The property information may include at least one of a white point, a gamma value, color temperature, and color gamut of the image.

The property information may further include information related to a variation in the property information, and the variation may be a difference value in at least one type of the property information between a previous image and a current image.

The ambient environment information may include at least one of brightness information of an ambient environment of the display device, color information of ambient lighting and distance information between a user and the display device.

The obtaining of the ambient environment information may include recognizing a certain body part of the user; obtaining a size value of the recognized body part one or more times in a certain time cycle; calculating an average value of the obtained size values; and obtaining the distance information between the user and the display device based on the average value.

The processing of the image may include determining a parameter of an image processing algorithm based on the property information and the ambient environment information; and processing the image by using the determined parameter.

The determining of the parameter may include determining the parameter by using a certain mathematical expression having the property information and the ambient environment information as input values, and having the parameter as an output value.

The determining of the parameter may include determining the parameter by using a lookup table including parameter values determinable according to values of the property information and the ambient environment information.

The image processing algorithm may include an algorithm for controlling the quality of the image by performing at least one of sharpness improvement, contrast control, noise reduction and saturation control.

The processing of the image may include determining a physical property of the image based on the property information and the ambient environment information; and processing the image by using the determined physical property.

The determined physical property may include at least one of color temperature, a gamma value, a white point and primary colors.

The processing of the image may include processing the image based on the property information and the ambient environment information, in response to a sense that at least one of the property information of the image and the ambient environment information obtained in a certain time cycle varies by a value equal to or greater than a reference value.

The obtaining of the property information of the image may include obtaining property information of images included in a certain unit, and the processing of the image may include processing the images in the certain unit based on the property information and the ambient environment information.

The image may be processed in units of one of a frame, a scene, and a sequence.

The processing of the image may include processing the image by gradually increasing or reducing a variable for processing the image based on the property information and the ambient environment information.

An aspect of an exemplary embodiment may provide an apparatus for processing an image, the apparatus including: an image property information obtainer configured to obtain information related to at least one property of an image; an ambient environment information obtainer configured to obtain ambient environment information related to ambient lighting around a display device or user information in order to display the image; an image processor configured to process the image based on the property information or the ambient environment information; and a sensor configured to recognize a certain body part of the user, wherein the ambient environment information obtainer is configured to obtain a size value of the recognized body part, calculate an average value of the obtained size value, and obtain distance information between the user and the display device.

The image processor may be configured to process the image based on the property information and the ambient environment information.

The image processor may be configured to determine a parameter of an image processing algorithm based on the property information and the ambient environment information, and process the image by using the determined parameter.

The property information may include at least one of a white point, a gamma value, a color temperature and a color gamut of the image.

The image processing apparatus may further include a display configured to display the processed image.

Displaying the processed image may be further included.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Reference will now be made in detail to the exemplary embodiments, examples of which are illustrated in the accompanying drawings, wherein like reference numerals refer to like elements throughout. In this regard, the present embodiments may have different forms and should not be construed as being limited to the descriptions set forth herein. Therefore, the embodiments are merely described below, by referring to the figures, to explain aspects of the present description.

The terms used in the specification and the claims should not be limited to conventional or lexical meanings and should be construed as having meanings and concepts corresponding to the technical idea of the exemplary embodiments in order to most appropriately describe the present invention. Therefore, the exemplary embodiments of the invention should be considered in a descriptive sense only and not for purposes of limitation, and all differences within the scope will be construed as being included in the present invention.

In this specification, an "embodiment" refers to, for example, particular characteristics, structures, or features described in relation to an exemplary embodiment included in at least one embodiment of the present invention. Therefore, the expression "according to an embodiment" in various parts of the specification does not always refer to the same embodiment.

Throughout the specification, the term 'image' may refer to an 'image' itself, and may also refer to various types of video data, for example, a 'frame', a 'field', and a 'slice'.

An 'image' that is processed according to an exemplary embodiment may include a partial or whole screen displayable on a display device, as well as a photo or a video. Although an 'image' is representatively described in this specification, the 'image' may include a displayable screen itself, for example, a user interface screen or a web page screen, as well as a photo or a video according to its original meaning.

According to an exemplary embodiment, an image processed by an image processing apparatus may be transmitted to and displayed on a display device. Alternatively, the image may be displayed on a display included in the image processing apparatus.

As used herein, expressions such as "at least one of," when preceding a list of elements, modify the entire list of elements and do not modify the individual elements of the list.

Figure 1:
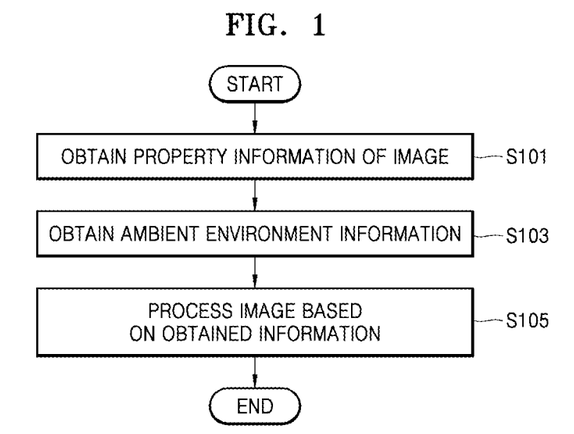
FIG. 1 is a flowchart of an image processing method according to an exemplary embodiment.

FIG. 1 is a flowchart of an image processing method according to an exemplary embodiment.

Referring to FIG. 1, in operation S101, an image processing apparatus according to an exemplary embodiment may obtain property information of an image to be displayed on a display device.

According to an exemplary embodiment, the property information of the image may include visual property information related to colors of the image, and may include one of brightness, white point, gamma value, color temperature, and color gamut of the image.

The brightness of the image indicates how bright the image is and may be represented as a number.

The white point of the image may refer to a location of a white spot of the image in the color gamut. If the white point varies, the brightness of the image may also vary.

The gamma value indicates a range of a gray scale for representing shades of gray in the image, and an adjustment of the gamma value may change the contrast of the image.

The color temperature indicates colors of the image as temperatures. A high color temperature is represented as blue, and a low color temperature is represented as red.

The color gamut refers to a color space in a whole area of light, which may be represented on the image. For example, the color gamut may vary according to whether the image is represented on an RGB color system or a CMYK (cyan, magenta, yellow, black) color system.

In addition, the property information of the image may further include category information of the image, which indicates a category classified according to the contents of the image. According to an exemplary embodiment, the category of the image may be classified as, for example, news, a sport, a documentary, or a movie according to contents included in the image. In order to display an optimal image according to the category of the image, the image processing apparatus may determine an image processing condition, for example, a parameter of an image processing algorithm or a physical property of the image, and may process the image according to the determined value.

Also, in operation S103, the image processing apparatus may obtain ambient environment information of the display device for displaying the image.

According to an exemplary embodiment, the ambient environment information of the display device may include ambient lighting information and user information. The ambient lighting information is property information of lighting around the display device, and may include brightness, illuminance, color temperature, and color information related to ambient lighting. The user information may include information related to a user who uses the display device, and may include, for example, distance information between the display device and the user, which indicates a viewing distance of the user, and eyesight information or age information of the user.

Since the user information includes the distance information, the image processing apparatus may determine physical properties of the image or the parameter of the image processing algorithm according to the viewing distance.

For example, in response to the viewing distance being small, the image processing apparatus may darken the image or may reduce a level of improving details of the image. In other words, in response to the viewing distance being small, a level of improving recognizable image quality may be low. In response to the image being processed to enhance edges of the image or to be sharpened according to a sharpness improving algorithm, artifacts for enhancing the edges, for example, a halo, may be generated around the edges. In response to the generated artifacts being noticeably observed, a user may recognize the generated artifacts as a reduction in image quality. As such, in response to the viewing distance being small, the level of improving image quality may be low.

Since the user information further includes the eyesight information or the age information of the user, the image processing apparatus may determine the physical property of the image or the parameter of the image processing algorithm according to eyesight of the user. In particular, in response to the user having bad eyesight or being old so as not to have good eyesight, the image processing apparatus may increase the brightness or saturation of the image so as to allow the user to better recognize the image. Also, according to the eyesight information of the user, even in response to the viewing distance being small, the image processing apparatus may set a high level for image quality improvement, for example, sharpness improvement or edge enhancement, and thus may allow the user to recognize the image in good quality.

In operation S105, the image processing apparatus may process the image to be displayed on the display device, based on the property information of the image and the ambient environment information obtained in operations S101 and S103.

According to an exemplary embodiment, the image processing apparatus may determine the parameter of the image processing algorithm or the physical property of the image based on the property information and the ambient environment information of the image, and may process the image according to the determined value.

The image processing apparatus may process the image based on the property information of the image itself to be displayed, as well as the ambient environment information of the display device for displaying the image. Therefore, the image processing apparatus according to an exemplary embodiment may output a higher-quality image in comparison to a case in response to the image being processed in consideration of only the ambient environment information.

According to an exemplary embodiment, the 'image' processed by the image processing apparatus is not limited to a video or a photo, and may include a screen itself displayable on the display device. In other words, a user interface screen, an application execution screen, or a web page screen displayed on the display device may also be processed by the image processing apparatus according to an exemplary embodiment screen or current ambient environment information of the display device.

The image processing apparatus may automatically process the image according to an embodiment of the present invention, or may provide a recommended setting value to the user so as to allow the user to determine whether to process the image. The recommended setting value may include one or more variables included in the parameter of the image processing algorithm or the physical property of the image determined to process the image. The recommended setting value may be set to be determined within a limited range, and thus a reduction in quality due to user settings may be prevented.

According to an exemplary embodiment, in order to prevent flickering generated in response to the image being processed, the image processing apparatus may process the image by gradually varying the variables for processing the image based on the property information and the ambient environment information. Therefore, the image processing apparatus may process the image by gradually increasing or reducing the variables included in the parameter of the image processing algorithm or the physical property of the image for a certain time or in certain frames of the image.

Figure 2:
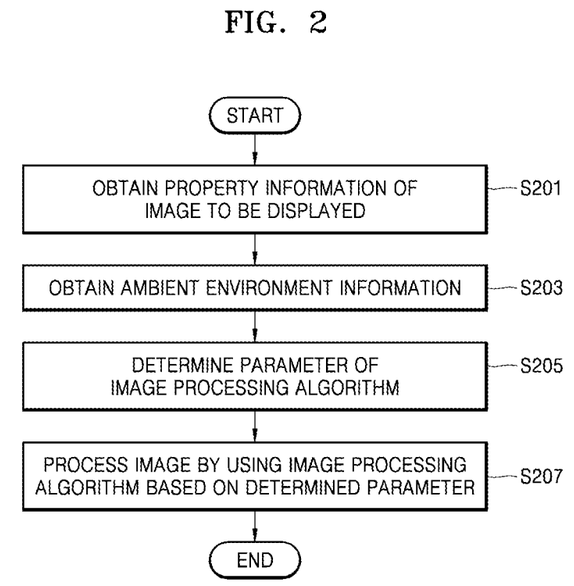
FIG. 2 is a flowchart of an image processing method using an image processing algorithm, according to an exemplary embodiment.

FIG. 2 is a flowchart of a method of processing an image using an image processing algorithm, according to an exemplary embodiment. Operations S201, S203, and S207 of FIG. 2 correspond to operations S101, S103, and S105 of FIG. 1, and repeated descriptions thereof are not provided here.

Referring to FIG. 2, in operation S201, an image processing apparatus according to an embodiment of the present invention may obtain property information of an image to be displayed on a display device.

In operation S203, the image processing apparatus may obtain ambient environment information of the display device for displaying the image.

In operation S205, the image processing apparatus may determine a parameter of the image processing algorithm by using the property information of the image or the ambient environment information obtained in operation S201 or S203.

The image processing algorithm may include an algorithm for improving sharpness or details of the image by detecting a certain region of the image, for example, an edge or texture region, and processing pixel values of the detected region. The image processing algorithm may be applied to a whole region or only to a selected partial region of the image, according to the settings.

According to an exemplary embodiment, the image processing algorithm used to process the image may include an algorithm for improving image quality; for example, an algorithm for sharpness improvement, details improvement, contrast control, noise reduction or saturation control.

The image processing algorithm may include parameters for determining a reference value (threshold) for detecting a certain region for processing the image from an original image, or an intensity of the algorithm. Since sharpness or details of the image recognizable to the user may vary according to properties of the image and an ambient environment, according to an exemplary embodiment, the image processing apparatus may determine an optimal parameter of the image processing algorithm in consideration of the property information of the image and the ambient environment information.

For example, the parameter of the image processing algorithm for sharpness improvement may be determined as a parameter value for reducing a sharpness level of the image in response to the brightness of the image being high, or if a difference between the brightness of the image and the brightness of the ambient environment is large, so as to allow the user to easily recognize the displayed image.

For the image processing algorithm, a developer of the image processing algorithm may provide parameters having primary optimal values in a certain range according to an apparatus, and the user may secondarily control the parameters within the range of the primary optimal values. The above two-step parameter determination may reduce convenience to the user and may not easily achieve optimized performance using the algorithm. Therefore, according to an exemplary embodiment, the image processing apparatus may process the image in real time by using the ambient environment information or the physical property information of the image itself, and thus the performance of the algorithm may be maximized. Also, the image may be automatically processed without control of the user, and thus convenience may be increased.

In operation S205, the image processing apparatus may determine the parameter of the image processing algorithm according to a preset lookup table (LUT) or a mathematical expression.

The LUT is a data structure which includes an alignment of previously calculated results of a given operation, and may be used to obtain a value faster in comparison to a case that the image processing apparatus calculates a result of the given operation. According to an exemplary embodiment, the image processing apparatus may determine the parameter of the image processing algorithm by using the LUT according to the property information of the image and the ambient environment information obtained in operations S201 and S203.

In operation S205, instead of the LUT, the image processing apparatus may determine the parameter by using a certain mathematical expression having the property information of the image and the ambient environment information obtained in operations S201 and S203 as input values, and having the parameter of the image processing algorithm as an output value.

For example, in the image processing algorithm for sharpness improvement, it is assumed that the brightness of the image is 200 cd/m$^2$, that 200 is a reference value of the parameter for processing the image to be displayed as an optimal image, and that a parameter value is variable according to the brightness of the image. In this case, the parameter value may be proportional to a level of sharpness.

If the brightness of the image varies from 200 cd/m$^2$, i.e., the reference value, to 300 cd/m$^2$, the parameter value may be determined as 150 and the image may be processed according to the determined parameter value. Since, in response to the brightness of the image being high, artifacts generated in the image processed according to the image processing algorithm for sharpness improvement are better recognizable, the image processed by reducing the parameter value may be recognized as having better quality.

On the other hand, in response to the brightness of the image not varying and the brightness of ambient lighting being increased, a high level of sharpness may allow the image to be recognized as having better quality. Therefore, the image may be processed by increasing the parameter value.

Also, in response to a viewing distance being reduced by 20% or more in comparison to an average viewing distance of the user, since artifacts generated in the image processed according to the image processing algorithm for sharpness improvement are better recognizable, the image processed by reducing the parameter value may be recognized as having better quality.

In operation S207, the image processing apparatus may process the image by using the image processing algorithm according to the parameter determined in operation S205. In this case, the image processing apparatus may immediately process a currently displayed image so as to display the processed image, or may select and process an appropriate image, for example, a first image of a certain scene or a first image of a sequence. In response to the image being processed in units of a scene or a sequence, or in response to a display screen being processed, the image processing apparatus may group a plurality of images in a certain time cycle, and may process the images in units of a group by using the image processing algorithm according to the parameter determined in operation S205.

Alternatively, in response to a screen displayed on the display device being changed, the image processing apparatus may determine a parameter to be applied to the currently changed screen until the screen is changed again, and may process the screen according to the determined parameter. The image processed by the image processing apparatus may be displayed on the display device.

Figure 3:
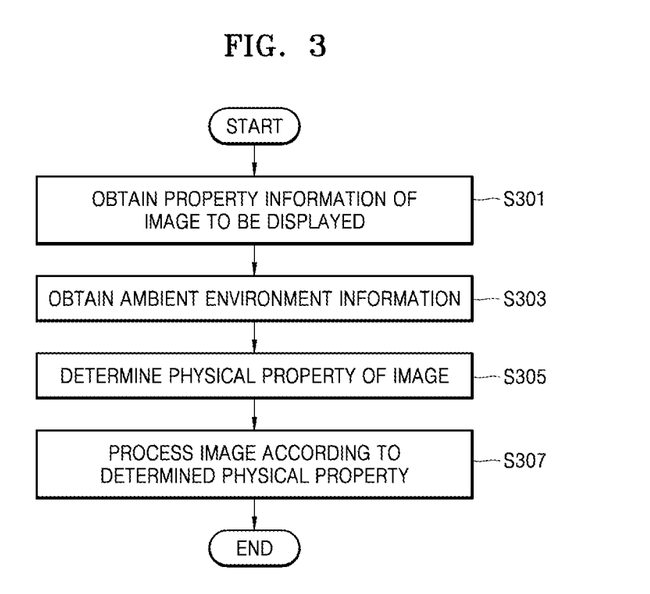
FIG. 3 is a flowchart of an image processing method using a physical property of an image, according to an exemplary embodiment

FIG. 3 is a flowchart of an image processing method using a physical property of an image, according to an exemplary embodiment. Operations S301, S303, and S307 of FIG. 3 correspond to operations S101, S103, and S105 of FIG. 1, and repeated descriptions thereof are not provided here.

Referring to FIG. 3, in operation S301, an image processing apparatus according to an exemplary embodiment may obtain property information of an image to be displayed on a display device.

In operation S303, the image processing apparatus may obtain ambient environment information of the display device for displaying the image.

In operation S305, the image processing apparatus may determine the physical property of the image by using the property information of the image or the ambient environment information obtained in operation S301 or S303.

Like the property information of the image obtained in operation S301, the physical property determined in operation S305 may include visual property information related to colors of the image. For example, the physical property determined in operation S305 may include one of brightness, white point, a gamma value, a color temperature, a color gamut, and RGB primary colors of the image.

For example, the image processing apparatus may determine a physical property value of the image, e.g., a white point, a gamma value, or color temperature of the image, which is the most easily recognizable to the user, based on brightness or based on a category of the image. In response to the category of the image being a sport, since contrast should be high to allow a displayed ball or player to be easily recognizable to the user, the image processing apparatus may determine the gamma value so as to increase the contrast of the image.

The image processing apparatus may determine a physical property value of the image, which includes the brightness or the color temperature of the image, based on a viewing distance of the user, and ambient environment information including property information of ambient lighting. For example, the image processing apparatus may determine the brightness of the image to be high in response to the viewing distance of the user being large or in response to the brightness of the ambient lighting being high. Thus, the user may recognize the image as having better quality.

In operation S307, the image processing apparatus may process the image according to the physical property value determined in operation S305.

In this case, the image processing apparatus may immediately process a currently displayed image so as to display the processed image, or may select and process an appropriate image, for example, a first image of a certain scene or a first image of a sequence. In response to the image being processed in units of a scene or a sequence, or in response to a display screen being processed, the image processing apparatus may group a plurality of images in a certain time cycle, and may process the images in units of a group by using the physical property determined in operation S305.

Alternatively, in response to a screen displayed on the display device being changed, the image processing apparatus may determine a value of a physical property of the image to be applied to the currently changed screen until the screen is changed again, and may process the screen according to the determined value. The image processed by the image processing apparatus may be displayed on the display device.

Figure 4:
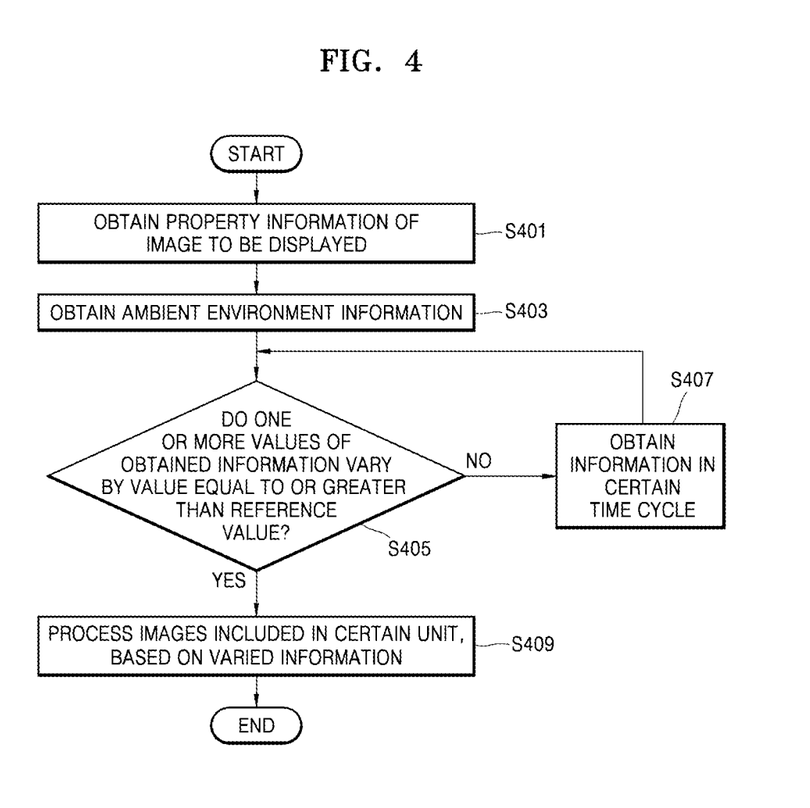
FIG. 4 is a flowchart of an image processing method based on a variation in detected information, according to an exemplary embodiment.

FIG. 4 is a flowchart of a method of image processing an image based on a variation in detected information, according to an exemplary embodiment. Operations S401, S403, and S409 of FIG. 4 correspond to operations S101, S103, and S105 of FIG. 1, and repeated descriptions thereof are not provided herein.

Referring to FIG. 4, in operation S401, an image processing apparatus according to an exemplary embodiment may obtain property information related to an image to be displayed on a display device.

In operation S403, the image processing apparatus may obtain ambient environment information of the display device for displaying the image.

In operation S405, the image processing apparatus may determine whether one or more values included in the property information of the image or the ambient environment information obtained in operation S401 or S403 differ from values obtained in a previous image or at a previous point of time by a value equal to or greater than a reference value.

According to a result of the determining in operation S405, in response to the values differing by a value equal to or greater than the reference value, in operation S409, the image processing apparatus may process the image based on the property information of the image or the ambient environment information obtained in operation S401 or S403.

Otherwise, in response to the values not differing by a value equal to or greater than the reference value, in operation S407, the image processing apparatus may obtain the property information of the image or the ambient environment information in a certain time cycle. The information obtained in operation S407 may be compared to the information obtained in the previous image or at the previous time point in operation S405, and thus a difference there between may be determined.

According to an exemplary embodiment, the image processing apparatus may obtain the property information of the image or the ambient environment information in a certain time cycle, and may process the image only in response to the obtained information differing from previous information by the value equal to or greater than the reference value. Therefore, the image processing apparatus may process the image only in response to quality improvement being required.

Figure 5:
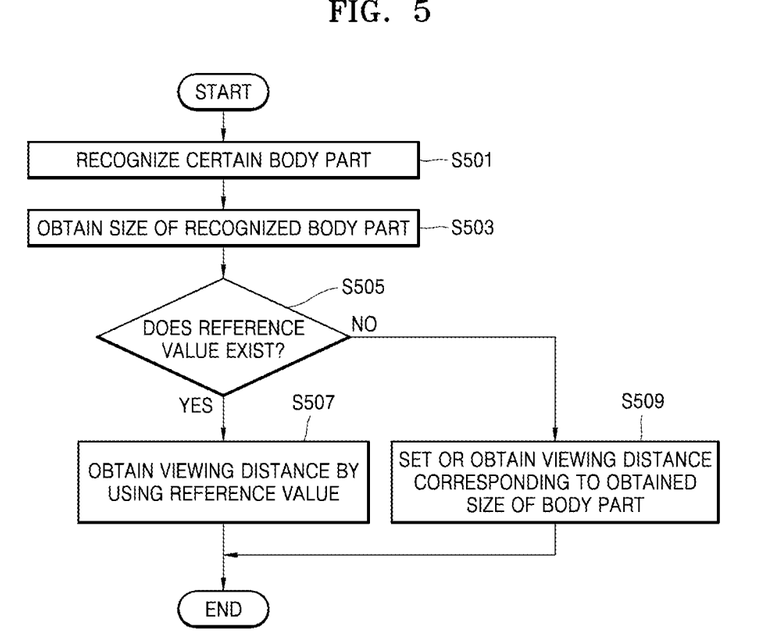
FIG. 5 is a flowchart of a method of obtaining a viewing distance of a user, according to an exemplary embodiment.

FIG. 5 is a flowchart of a method of obtaining a viewing distance of a user, according to an exemplary embodiment.

According to an exemplary embodiment, the viewing distance may refer to a distance between the user and a display device for displaying an image. Hereinafter, for convenience of explanation, an assumption is made that the display device is included in an image processing apparatus.

Referring to FIG. 5, in operation S501, the image processing apparatus may recognize a certain body part of the user, which may be used to obtain the viewing distance (S501). In this case, the image processing apparatus may include one or more of a proximity sensor, an image sensor, and an infrared sensor, and may recognize the body part of the user by using the sensors.

In operation S503, the image processing apparatus may obtain a size of the body part recognized in operation S501. The size of the body part may be determined as a value of a diameter, an area, or a circumference.

In operation S505, the image processing apparatus may determine whether a reference value regarding the body part recognized in operation S501 exists.

In response to the reference value existing, in operation S507, the image processing apparatus may obtain the viewing distance which corresponds to the size of the body part obtained in operation S503, by using the reference value. The reference value may include viewing distance values which correspond to sizes of body parts and thus is used to obtain the viewing distance which corresponds to the obtained size of the body part.

Otherwise, in response to the reference value not existing, in operation S509, the image processing apparatus may obtain the viewing distance which corresponds to the obtained size of the body part by using a value set by the user, or a value obtained by the sensors of the image processing apparatus. In general, in response to the size of the body part being large, the viewing distance may be small.

In addition, the image processing apparatus may set the reference value of the certain body part, which may be used to obtain the viewing distance, by using the viewing distance obtained in operation S509, and the viewing distance may later be easily calculated by using the set reference value.

The image processing apparatus may recognize the body part a plurality of times in a certain time cycle, and may determine an average value of viewing distances obtained based on results of the recognizing, as the viewing distance of the user. Therefore, the image processing apparatus may minimize an error of misrecognizing the body part.

The image processing apparatus may obtain one or more viewing distances by recognizing one or more body parts, and may determine an average value of the viewing distances as the viewing distance. The image processing apparatus may recognize one or more body parts, may determine an average value of viewing distances which correspond to the body parts, as the viewing distance of the user, and thus may more accurately obtain the viewing distance.

For example, the image processing apparatus may recognize a head of the user, and may determine the viewing distance of the user according to a variation in size of the head. The image processing apparatus may recognize a hand or foot of the user and may determine the viewing distance of the user according to a variation in size of the hand or foot. The image processing apparatus may determine an average value of the viewing distances determined according to the body parts, as the viewing distance.

In addition to the body part of the user, the viewing distance may be obtained based on a terminal device of the user, e.g., a remote controller or a mobile phone. In other words, the image processing apparatus may receive a viewing distance determined by the terminal device, including an infrared sensor or an image sensor, from the terminal device. Alternatively, the image processing apparatus may determine a viewing distance by receiving an infrared ray transmitted from the terminal device. The image processing apparatus may calculate an average of the viewing distance obtained by the terminal device and the viewing distance obtained by recognizing the body part, and thus may determine the viewing distance more accurately.

Although the above description is provided on the assumption that the display device is included in the image processing apparatus, the display device is not limited thereto. The display device may include a sensor for recognizing the user, the sensor may transmit obtained information to the image processing apparatus, and thus the image processing apparatus may obtain the viewing distance between the user and the display device. The display device may include an image sensor or a camera sensor so as to recognizing a body part of the user, and may transmit information related to the recognized body part, for example, image data related to the body part of the user, which is obtained by the display device, to the image processing apparatus.

The structure of the above-described image processing apparatus is now described in detail with reference to FIGS. 6 and 7.

Figure 6:
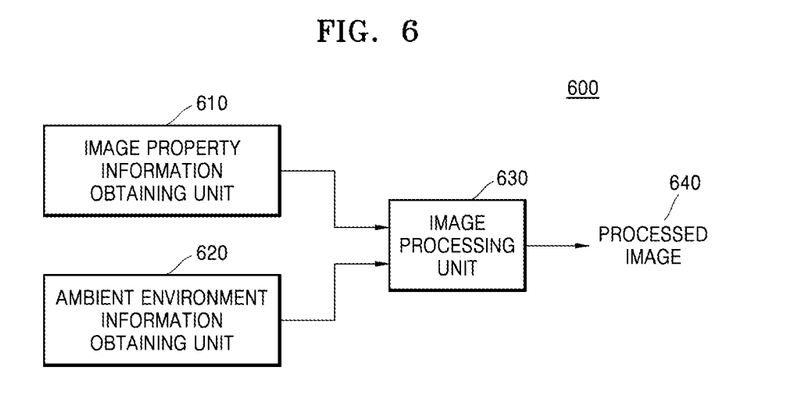
FIGS. 6 and 7 are block diagrams of image processing apparatuses according to exemplary embodiments.

FIG. 6 is a block diagram of an image processing apparatus 600 according to an exemplary embodiment.

Referring to FIG. 6, the image processing apparatus 600 may include an image property information obtainer 610, an ambient environment information obtainer 620, and an image processor 630.

The image property information obtainer 610 may obtain property information of an image to be displayed on a display device.

The ambient environment information obtainer 620 may obtain ambient environment information of the display device to display the image. The ambient environment information may include ambient lighting information and user information. The ambient lighting information may refer to information related to light around the display device, and may include brightness, intensity and color temperature information related to the light. The user information may refer to information related to a user who views the image on the display device, and may include a viewing distance or eyesight or age information of the user.

The image processor 630 may process the image based on the property information of the image or the ambient environment information obtained by the image property information obtainer 610 or the ambient environment information obtainer 620. The image processed by the image processor 630 is not limited to a video or a photo, and a displayable user interface screen or a web page screen may also be processed according to an embodiment An image 640 processed by the image processor 630 may be transmitted to a display device (not shown) located outside the image processing apparatus 600, or may be displayed on a display unit (not shown) in the image processing apparatus 600.

The display device may receive the image 640 processed by the image processing apparatus 600 according to an exemplary embodiment, from the image processing apparatus 600 and may display the processed image 640.

Alternatively, the display in the image processing apparatus 600 may display the processed image 640.

Alternatively, a cloud server may include the configuration of the image processing apparatus 600. In response to the display device generating a control signal, the cloud server may process the image by receiving the control signal, and may transmit the processed image to the display device, and the display device may display the processed image.

Figure 7:
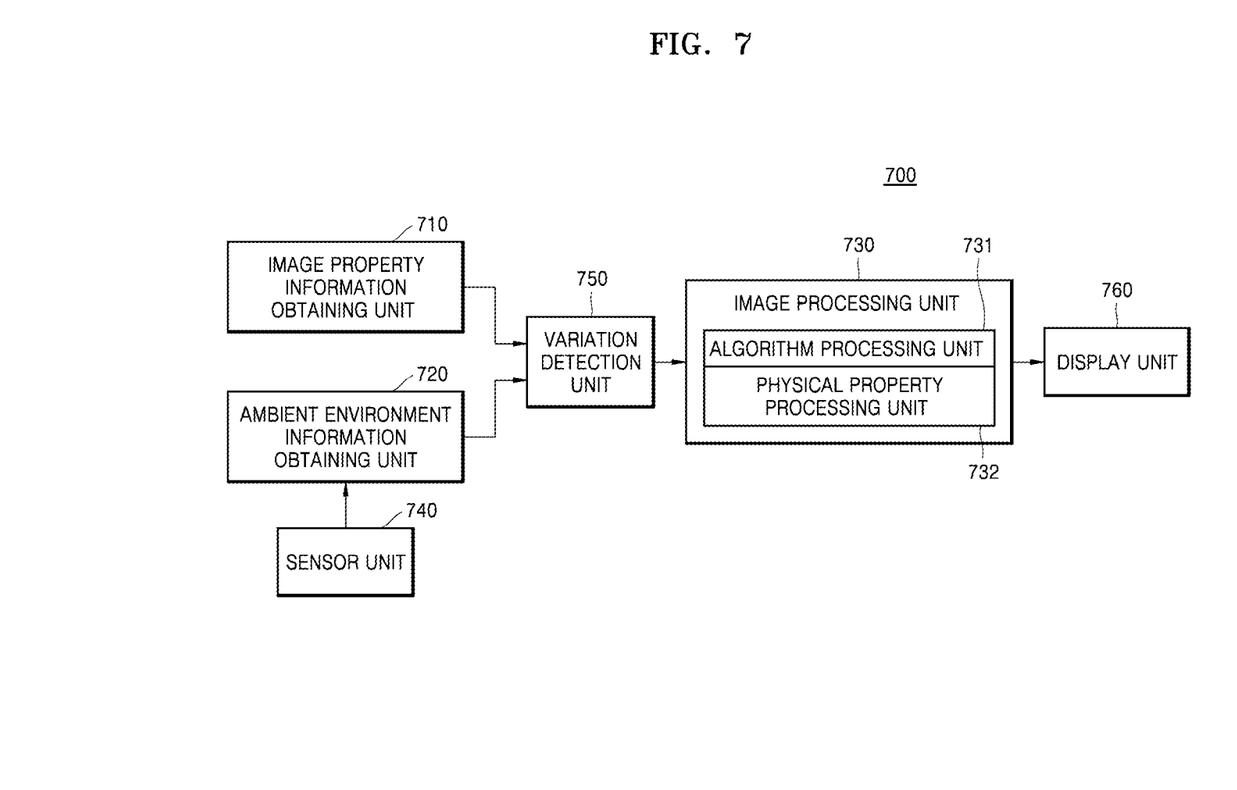

FIG. 7 is a block diagram of an image processing apparatus 700 according to another exemplary embodiment. An image property information obtainer 710, an ambient environment information obtainer 720, and an image processor 730 of FIG. 7 correspond to the image property information obtainer 610, the ambient environment information obtainer 620, and the image processor 630 of FIG. 6, and repeated descriptions thereof are not provided herein.

The image processing apparatus 700 of FIG. 7 may include the image property information obtainer 710, the ambient environment information obtainer 720, the image processor 730, a sensor 740, a variation detector 750, and a display 760.

The image property information obtainer 710 may obtain property information related to an image to be displayed on the display 760.

The ambient environment information obtaining unit 720 may obtain ambient environment information of the display 760 for displaying the image.

The sensor 740 may be connected to the ambient environment information obtainer 720, may detect information to obtain the ambient environment information of the display 760, and may transmit the detected information to the ambient environment information obtainer 720. The sensor 740 may include one or more of an infrared sensor, a light sensor, a color recognition sensor, an image sensor, an ambient light sensor and a proximity sensor.

The light sensor or the ambient light sensor may measure brightness of lighting around the display 760.

The color recognition sensor may recognize information related to colors of ambient lighting of the display 760; for example, a color gamut or color temperature of the ambient lighting. The color recognition sensor may include an RGB sensor or a color sensor.

The image sensor or the proximity sensor may recognize a body part of a user. The image sensor may obtain a captured image of the body part of the user, and the proximity sensor may sense an electromagnetic variation so as to recognize that the body part of the user approaches nearby.

The infrared sensor may be included in a terminal device (not shown) such as a remote controller or a mobile phone, and the image processing apparatus 700 may determine a viewing distance by receiving an infrared ray transmitted from the terminal device. Alternatively, the terminal device may determine the viewing distance by receiving an infrared ray transmitted from the image processing apparatus 700. The terminal device may be a device carried by the user who uses the image processing apparatus 700, and may be used in response to the image processing apparatus 700 determining the viewing distance of the user.

The variation detector 750 may be connected to the image property information obtainer 710 and the ambient environment information obtainer 720, and may detect a variation in the property information of the image or the ambient environment information obtained by the image property information obtainer 710 or the ambient environment information obtainer 720. In other words, the variation detector 750 may determine whether the variation in the currently obtained property information of the image or the ambient environment information is equal to or greater than a reference value, by comparing it to the property information of the image or the ambient environment information obtained at a previous time point or in a previous image. In response to a determination that the variation is equal to or greater than the reference value, the variation detector 750 may transmit the currently obtained property information of the image or the ambient environment information to the image processor 730, and thus the image processed according to the transmitted information may be displayed on the display 760.

The image processor 730 may process the image based on the property information of the image or the ambient environment information obtained by the image property information obtainer 710 or the ambient environment information obtainer 720.

The image processor 730 may include an algorithm processor 731 and a physical property processor 732.

The algorithm processor 731 may determine a parameter of an image processing algorithm based on the property information of the image or the ambient environment information, and may process the image by using the image processing algorithm according to the determined parameter.

The physical property processor 732 may determine a physical property of the image based on the property information of the image or the ambient environment information, and may process the image according to the determined physical property of the image.

The display 760 may receive and display the image processed by the image processor 730.

As described above, according to one or more of the above exemplary embodiments, an image processing apparatus may process a displayed image in consideration of properties of the image itself as well as ambient environment information of a display device. Thus, the display device may display a quality-improved image.

Also, the display device may display an image processed by applying an image processing algorithm according to an optimal parameter determined based on ambient environment information of the display device or the property information of the image.

The exemplary embodiments can also be implemented as computer-readable code on a computer-readable recording medium. The computer-readable recording medium is any data storage device that can store data which can be thereafter read by a computer system. Examples of the computer-readable recording medium include ROM, RAM, CD-ROMs, magnetic tapes, floppy disks, optical data storage devices, etc.

While the exemplary embodiments have been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of processing an image to be displayed, the method comprising:
    obtaining property information related to an inherent property of the image;
    obtaining ambient environment information of a display device for displaying the image; and
    processing the image based on the property information and the ambient environment information,
    wherein the processing comprises adjusting a sharpness level of the image, based on a difference between a brightness of the image and a brightness of an ambient environment, and
    wherein the sharpness level of the image is adjusted inversely proportional to the difference between the brightness of the image and the brightness of the ambient environment.

2. The method of claim 1, wherein the property information comprises at least one of a white point, a gamma value, a color temperature, and a color gamut of the image.

3. The method of claim 2, wherein the property information further comprises information related to a variation in the property information, and wherein the variation is a difference value in at least one type of the property information between a previous image and a current image.

4. The method of claim 1, wherein the ambient environment information comprises at least one of brightness information of an ambient environment of the display device, color information of ambient lighting and the distance between the user and the display device.

5. The method of claim 1, wherein the obtaining of the ambient environment information comprises:
    recognizing a certain body part of the user;
    obtaining a size value of the recognized body part one or more times in a certain time cycle;
    calculating an average value of the obtained size values; and
    obtaining the distance between the user and the display device, based on the average value of the obtained size values.

6. The method of claim 1, wherein the processing of the image comprises:
    determining a parameter of an image processing algorithm based on the property information and the ambient environment information; and
    processing the image by using the determined parameter.

7. The method of claim 6, wherein the determining of the parameter comprises determining the parameter by using a certain mathematical expression having the property information and the ambient environment information as input values, and having the parameter as an output value.

8. The method of claim 6, wherein the determining of the parameter comprises determining the parameter by using a lookup table comprising parameter values determinable according to values of the property information and the ambient environment information.

9. The method of claim 6, wherein the image processing algorithm comprises an algorithm to control quality of the image by performing at least one of sharpness improvement, contrast control, noise reduction and saturation control.

10. The method of claim 1, wherein the processing of the image comprises:
    determining a physical property of the image based on the property information and the ambient environment information; and
    processing the image by using the determined physical property.

11. The method of claim 10, wherein the determined physical property comprises at least one of a color temperature, a gamma value, a white point, and primary colors.

12. The method of claim 1, wherein the processing of the image comprises, in response to it being sensed that at least one of the property information of the image and the ambient environment information obtained in a certain time cycle varies by a value equal to or greater than a reference value, processing the image based on the property information and the ambient environment information.

13. The method of claim 1, wherein the obtaining of the property information of the image comprises obtaining property information related to images comprised in a certain unit, and
    wherein the processing of the image comprises processing the images in the certain unit based on the property information and the ambient environment information.

14. The method of claim 13, wherein the image is processed in units of one of a frame, a scene and a sequence.

15. The method of claim 1, wherein the processing of the image comprises processing the image by gradually increasing or reducing a variable for processing the image based on the property information and the ambient environment information.

16. The method of claim 1, further comprising displaying the processed image.

17. The method of claim 1, wherein the image comprises a screen displayable on the display device comprising one of a user interface screen, a web page screen and an application execution screen.

18. An apparatus for processing an image to be displayed, the apparatus comprising:
a memory that obtains inherent property information of the image;
a sensor that obtains ambient environment information of a display device to display the image, the ambient environment information comprising a distance between a user and the display device;
an image processor that adjusts a sharpness level of the image based on the property information and the distance between the user and the display device,
wherein the image processor adjusts a sharpness level of the image, based on a difference between a brightness of the image and a brightness of an ambient environment, and
wherein the sharpness level of the image is adjusted inversely proportional to the difference between the brightness of the image and the brightness of the ambient environment.

19. The apparatus of claim 18, wherein the property information comprises at least one of a white point, a gamma value, a color temperature and a color gamut of the image.

20. The apparatus of claim 19, wherein the property information further comprises information related to a variation in the property information, and
wherein the variation is a difference value in at least one type of the property information between a previous image and a current image.

21. The apparatus of claim 18, wherein the ambient environment information comprises at least one of brightness information of an ambient environment of the display device, color information of ambient lighting and the distance between the user and the display device.

22. The apparatus of claim 18, further comprising a sensor that recognizes a certain body part of the user,
wherein the sensor obtains a size value of the recognized body part one or more times in a certain time cycle, calculates an average value of the obtained size values, and obtains the distance between the user and the display device, based on the average value.

23. The apparatus of claim 18, wherein the image processor determines a parameter of an image processing algorithm based on the property information and the ambient environment information, and processes the image by using the determined parameter.

24. The apparatus of claim 23, wherein the image processor determines the parameter by using a certain mathematical expression having the property information and the ambient environment information as input values, and having the parameter as an output value.

25. The apparatus of claim 23, wherein the image processor determines the parameter by using a lookup table comprising parameter values determinable according to values of the property information and the ambient environment information.

26. The apparatus of claim 23, wherein the image processor comprises an algorithm to control quality of the image by performing at least one of sharpness improvement, contrast control, noise reduction and saturation control.

27. The apparatus of claim 18, wherein the image processor determines a physical property of the image based on the property information and the ambient environment information, and process the image by using the determined physical property.

28. The apparatus of claim 27, wherein the determined physical property comprises at least one of a color temperature, a gamma value, a white point and primary colors.

29. The apparatus of claim 18, further comprising a variation detector that senses whether at least one of the property information of the image and the ambient environment information obtained in a certain time cycle varies by a value equal to or greater than a reference value,
wherein, in response to the variation detector sensing that at least one of the property information of the image and the ambient environment information varies by the value equal to or greater than the reference value, the image processor processes the image based on the property information and the ambient environment information.

30. The apparatus of claim 18, wherein the memory obtains property information related to images comprised in a certain unit, and the image processor processes the images in the certain unit based on the property information and the ambient environment information.

31. The apparatus of claim 30, wherein the image is processed in units of one of a frame, a scene and a sequence.

32. The apparatus of claim 18, wherein the image processor processes the image by gradually increasing or reducing a variable for processing the image based on the property information and the ambient environment information.

33. The apparatus of claim 18, further comprising a display that displays the processed image.

34. The apparatus of claim 18, wherein the image comprises a screen displayable on the display device comprising one of a user interface screen, a web page screen, and an application execution screen.

35. A non-transitory computer-readable recording medium having recorded thereon a computer program for executing the method of claim 1.

36. The method of claim 1, wherein the adjusting the sharpness level comprises reducing the sharpness level as the distance between the user and the display device becomes shorter.

37. The method of claim 1, wherein the processing further comprises darkening the image as the distance between the user and the display device becomes shorter.

38. The method of claim 1, wherein the processing further comprises reducing a level of details of the image as the distance between the user and the display device becomes shorter.

* * * * *